(12) United States Patent
Ishida

(10) Patent No.: US 6,531,956 B2
(45) Date of Patent: Mar. 11, 2003

(54) RADIO SELECTIVE CALLING APPARATUS SETTING AN ERASURE PROTECTION LEVEL BASED UPON A RECEIVED PROCESSING DESIGNATION CODE

(75) Inventor: Hiromichi Ishida, Shizuoka (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/213,159

(22) Filed: Dec. 17, 1998

(65) Prior Publication Data

US 2002/0002042 A1 Jan. 3, 2002

(30) Foreign Application Priority Data

Dec. 22, 1997 (JP) .............................. 9-352864

(51) Int. Cl.[7] .............................................. H04Q 7/18
(52) U.S. Cl. ...................................... 340/7.52; 455/412
(58) Field of Search ............................... 455/38.1, 38.2, 455/38.4, 227, 228, 186.1, 412; 340/825.44, 7.52, 7.41

(56) References Cited

U.S. PATENT DOCUMENTS

| | | | | |
|---|---|---|---|---|
| 4,988,991 A | * | 1/1991 | Motegi | 455/186.1 |
| 5,075,684 A | * | 12/1991 | DeLuca | 340/825.44 |
| 5,349,696 A | * | 9/1994 | Matai | 455/38.4 |
| 5,418,528 A | * | 5/1995 | Hosack et al. | 340/825.44 |
| 5,430,440 A | * | 7/1995 | Shim | 340/825.44 |
| 5,856,787 A | * | 1/1999 | Ikka | 340/7.41 |
| 5,959,542 A | * | 9/1999 | Ishida | 455/38.2 |
| 6,169,882 B1 | * | 1/2001 | Amma | 455/38.3 |

FOREIGN PATENT DOCUMENTS

| | | |
|---|---|---|
| JP | 61-67335 | 4/1986 |
| JP | 63-103524 | 5/1988 |
| JP | 64-7447 | 1/1989 |
| JP | 1-246930 | 10/1989 |
| JP | 11-88929 | 3/1990 |
| JP | 3-93325 | 4/1991 |
| JP | 3-289823 | 12/1991 |
| JP | 4-290016 | 10/1992 |
| JP | 5-244064 | 9/1993 |
| JP | 6-104818 | 4/1994 |
| JP | 7-79464 | 3/1995 |
| JP | 7-203511 | 8/1995 |
| JP | 7-288856 | 10/1995 |
| JP | 9-18918 | 1/1997 |

OTHER PUBLICATIONS

Japanese Office Action dated Oct. 26, 1999, with partial translation.

* cited by examiner

Primary Examiner—William Trost
Assistant Examiner—Philip J. Sobutka
(74) Attorney, Agent, or Firm—McGinn & Gibb, PLLC

(57) ABSTRACT

A radio selective calling apparatus includes a control section for receiving message information containing message data indicating a message from a base station. When a processing designation code for designating contents of processing for the message data is contained in the message information, the control section performs the processing designated by the processing designation code.

40 Claims, 5 Drawing Sheets

RADIO SELECTIVE CALLING APPARATUS SETTING AN ERASURE PROTECTION LEVEL BASED UPON A RECEIVED PROCESSING DESIGNATION CODE

BACKGROUND OF THE INVENTION

1. Field of the Invention

The present invention relates to a radio selective calling method and apparatus and, more particularly, to a radio selective calling apparatus having a protection function and erase function for message data.

2. Description of the Prior Art

As disclosed in, for example, Japanese Unexamined Patent Publication Nos. 2-24124 and 3-289823, in a radio selective calling method and apparatus of this type, when a user who has received message data determines that the message data is important, he/she performs key input operation for the message data to designate "protection" indicating that the message data is excluded from erase targets, thereby protecting it. In addition, while received message data is displayed, the message data is managed as unconfirmed message data until key input operation is performed. Message data other than the above protected message data and unconfirmed message data is regarded as an erasure-priority target. This message data as the erasure-priority target is erased by drop-out in a message data full state in which the memory is full of message data, or automatically erased when the power switch is turned on/off.

The radio selective calling apparatus disclosed in Japanese Unexamined Patent Publication No. 03-289823 has the function of erasing message data upon expiration of the valid period preset by the user (at the receiving end), which indicates the time interval during which the message data is not erased.

The radio selective calling apparatus disclosed in Japanese Unexamined Patent Publication No. 07-288856 has the function of storing received message data, together with time data sent by the caller, in the memory, and notifying the callee of the message data at the time indicated by the time data.

FIG. 1 is a block diagram showing a conventional radio selective calling apparatus. The conventional radio calling apparatus includes a receiving section 1, a decoding section 2, a control section 8, a notifying section 4, a storage section 5, a display section 3, and a key input section. The receiving section 1 receives a coded radio signal RS from a base station. The decoding section 2 receives the radio signal RS from the receiving section 1 and decodes it. When the selective call number for the self-apparatus is contained in the decoded radio signal RS, the decoding section 2 extracts message information including message data indicating a message from the radio signal RS and outputs the information. The control section 8 receives the message information from the decoding section 2 and causes a notifying section 4 to notify the reception of the message. The control section 8 then causes the storage section 5 to store the message data and causes the display section 3 to display it. The notifying section 4 notifies the reception of the message by using a buzzer, an LED, a vibrator, or the like. The storage section 5 stores the received message data. The display section 3 displays the message data.

The operation of the conventional radio selective calling apparatus in FIG. 1 will be described next. The message data sent from a base station is stored in the storage section 5 under the control of the control section 8. The user of this apparatus performs key input operation to make the display section 3 sequentially display the message data stored in the storage section 5 from the latest message, and checks the messages. The user then sets the protection function for a message with a high degree of importance and stores it in the storage section 5 by key input operation. This message, for which the protection function is set, is excluded from automatic erasure to be performed when the storage section 5 is full unless the user sets protection cancellation by key input operation. The message data designated by key input operation is erased. More specifically, of the message data stored in the storage section 5, the message data that are not protected are sequentially erased by drop-out from the oldest message data when the storage section 5 becomes full. The user can also erase all the stored message data by key input operation while checking them from the latest message data.

In the conventional radio selective calling apparatus described above, message data are basically managed on the reception order, and protection setting operation is performed for an important message in accordance with the judgement made by the user at the receiving end. For this reason, when the frequency of reception is high or the receiving apparatus is left unused for a long period of time and receiving operation is performed at a certain frequency, drop-out occurs due to the message full state of the storage section. As a result, the important message is erased without being read by the user. It is therefore hard to inform the user at the receiving end of an important message from the user at the transmitting end, i.e., the message provider.

Of the message data stored in the storage section, the unprotected message data are sequentially erased from the oldest message data when the storage section becomes full and drop-out occurs. Alternatively, the user performs key input operation to sequentially erase the message data from the latest message data while checking them. For this reason, even if the message provider (at the transmitting end) wants to cancel a message, or calls an apparatus with a wrong call number, the message provider cannot cancel the message. Therefore, a message transmission error at the transmitting end, i.e., the message provider, cannot be prevented.

In addition, of the message data stored in the storage section, the unprotected message data are sequentially erased from the oldest message data when the storage section becomes full and drop-out occurs. Alternatively, the user performs key input operation to sequentially erase the message data from the latest message data while checking them. For this reason, received message data is kept stored unless it is erased upon occurrence of drop-out or key input operation by the user. Depending on the frequency of use of this radio selective calling apparatus, therefore, old messages may be left in the storage section for a long period of time.

SUMMARY OF THE INVENTION

The present invention has been made in consideration of the above situation, and its object is to provide a radio selective calling apparatus which allows an important message from a message provider at the transmitting end to be easily transmitted to the user at the receiving end, can prevent a message transmission error at the transmitting end, and avoids an old message from being kept in a storage section for a long period of time.

In order to achieve the above objects, the present invention has the following four main aspects.

According to the first main aspect, there is provided a radio selective calling apparatus comprising a control section for receiving message information containing message data indicating a message from a base station, and when a processing designation code for designating contents of processing for the message data is contained in the message information, performing processing designated by the processing designation code.

According to the second main aspect, there is provided a radio selective calling apparatus comprising a control section for receiving message information containing message data indicating a message from a base station, and when a processing designation code for designating contents of processing for the message data is contained in the message information, performing processing designated by the processing designation code, and when the processing designation code is not contained, notifying reception of the message, storing the message data, and displaying the message data.

According to the third main aspect, there is provided a radio selective calling apparatus comprising

- a decoding section for decoding a coded radio signal sent from a base station, and when a selective call number of the apparatus is contained in the decoded radio signal, extracting message information containing message data indicating a message from the radio signal, and outputting the information; and
- a control section for receiving the message information from the decoding section, and when a processing designation code for designating contents of processing for the message data is contained in the message information, performing processing designated by the processing designation code, and when the processing designation code is not contained, causing a notifying section to notify reception of the message, causing a storage section to store the message data, and causing a display section to display the message data.

According to the fourth main aspect, there is provided a radio selective calling apparatus comprising:

- a receiving section for receiving a coded radio signal from a base station;
- a decoding section for receiving the radio signal from the receiving section and decoding the radio signal, and when a selective call number of the apparatus is contained in the decoded radio signal, extracting message information containing message data indicating a message from the radio signal, and outputting the information;
- a notifying section for notifying reception of the message;
- a storage section for storing the message data;
- a display section for displaying the message data; and
- a control section for receiving the message information from the decoding section, and when a processing designation code for designating contents of processing for the message data is contained in the message information, performing processing designated by the processing designation code, and when the processing designation code is not contained, causing the notifying section to notify reception of the message, causing the storage section to store the message data, and causing the display section to display the message data.

In order to achieve the above object, the present invention also has the following subsidiary aspects.

According to the first subsidiary aspect, when the processing designation code in each of the main aspects is a code for designating "protection" indicating that the message data is excluded from erase targets, protection designation data as data for designating protection is stored in correspondence with the message data.

According to the second subsidiary aspect, when the processing designation code in each of the main aspects is a code for designating "protection cancellation" indicating that the message data is an erase target, it is checked whether the message data in the message information in which the processing designation code was contained is stored in advance, and protection designation data as data for designating protection which is stored in correspondence with the message data is erased if the message data is stored in advance.

According to the third subsidiary aspect, when the processing designation code in each of the main aspects is a code for designating "erasure" indicating that the message data is to be erased, it is checked whether the message data in the message information in which the processing designation code was contained is stored in advance, and the message data is erased if protection designation data as data for designating protection is not stored in correspondence with the message data.

According to the fourth subsidiary aspect, when the processing designation code in each of the main aspects is a code for designating "valid period" indicating a time interval during which the message data is not erased, valid period data indicating a valid period is stored in correspondence with the message data.

According to the fifth subsidiary aspect, the processing designation code in each of the main aspects may comprise a plurality of processing designation codes.

In addition, in the fourth subsidiary aspect, when data indicating a valid period is contained in the message information containing the processing designation code, the valid period data stored in correspondence with the message data is set as data indicating the valid period, and when data indicating the valid period is not contained in the message information, predetermined data is set as data indicating the valid period.

Furthermore, in the fourth subsidiary aspect, the apparatus can further include a message data valid period monitoring section for checking the stored valid period data at a predetermined timing, and erasing the message data stored in correspondence with the valid period data when the valid period indicated by the data has passed.

As is obvious from the above aspects, according to the radio selective calling apparatus, when the message information received from a base station and containing message data contains a processing designation code for designating the contents of processing for the message data, the control section performs the processing designated by the processing designation code. If this processing designation code is the code for designating "protection", protection designation data is stored in the storage section in correspondence with the message data to set the message data as data that is excluded from erase targets. The message provider at the transmitting end can therefore transmit an important message upon designating "protection" for the message, thereby preventing this message data from being erased. This makes it easy to inform the user of the important message at the receiving end.

If this processing designation code is the code for designating "erasure", it is checked whether the message data in the message information in which the processing designation code was contained is stored in advance. If protection designation data as data for designating protection is not stored in the storage section in correspondence with the message data, the message data is erased. With this operation, after the message provider at the transmitting end erroneously transmits message data, he/she can erase this message data by transmitting the message data upon adding the code for designating "erasure" to the message data.

If this processing designation code is the code for designating "valid period", valid period data indicating the valid period is stored in the storage section in correspondence with the message data, and the message data valid period monitoring section erases message data upon expiration of the valid period. This can therefore prevent an old message from being left in the storage section for a long period of time.

As described above, information indicating message provider's intention at the transmitting end can be received, countermeasures against transmission errors at the transmitting end and transfer of message information with a high degree of importance can be effectively performed. Memory management can be efficiently performed by storage management of the storage section based on valid period data. More specifically, the user at the transmitting end sends a message as a message to be protected in accordance with the degree of importance. In addition, when a message is erroneously transmitted, the message can be canceled. This allows reliable transmission of the contents of a message more reliably and can improve the reliability of information.

The present invention will become manifest to those skilled in the art upon making reference to the following detailed description and accompanying drawings in which preferred embodiments incorporating the principles of the present invention are shown by way of illustrative examples.

DETAILED DESCRIPTION OF PREFERRED EMBODIMENTS

Several preferred embodiments of the present invention will be described below with reference to the accompanying drawings.

Figure 1:
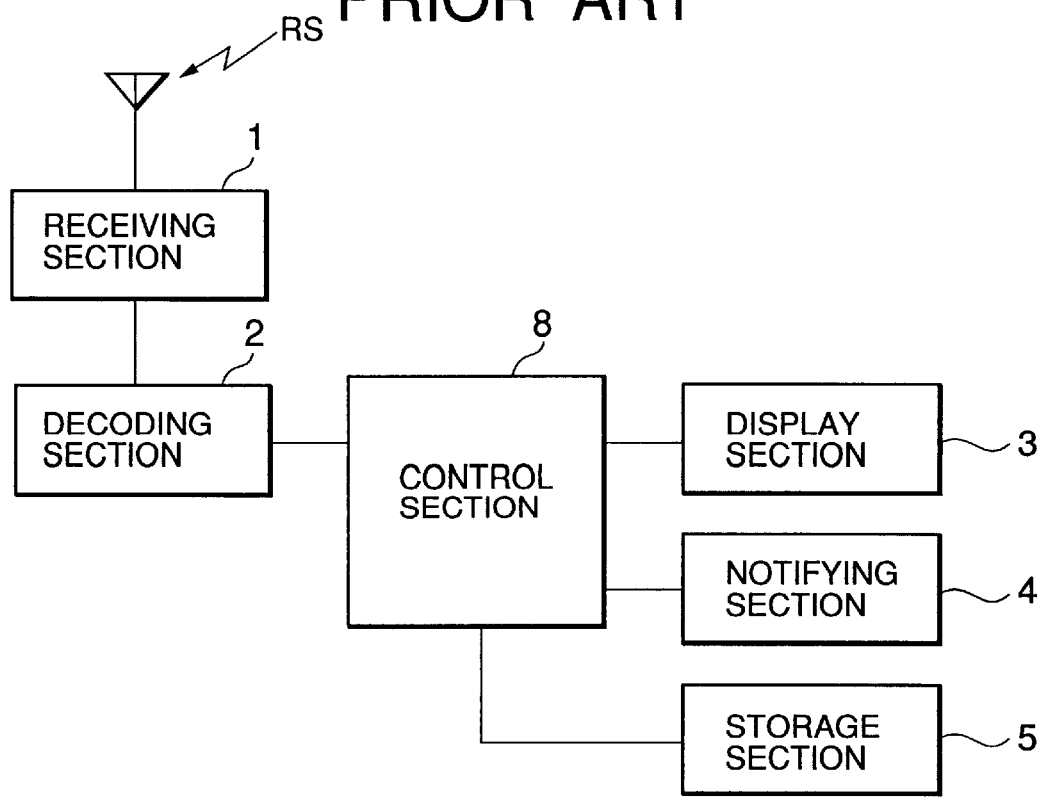
FIG. 1 is a block diagram showing a conventional radio selective calling apparatus.
Figure 2:
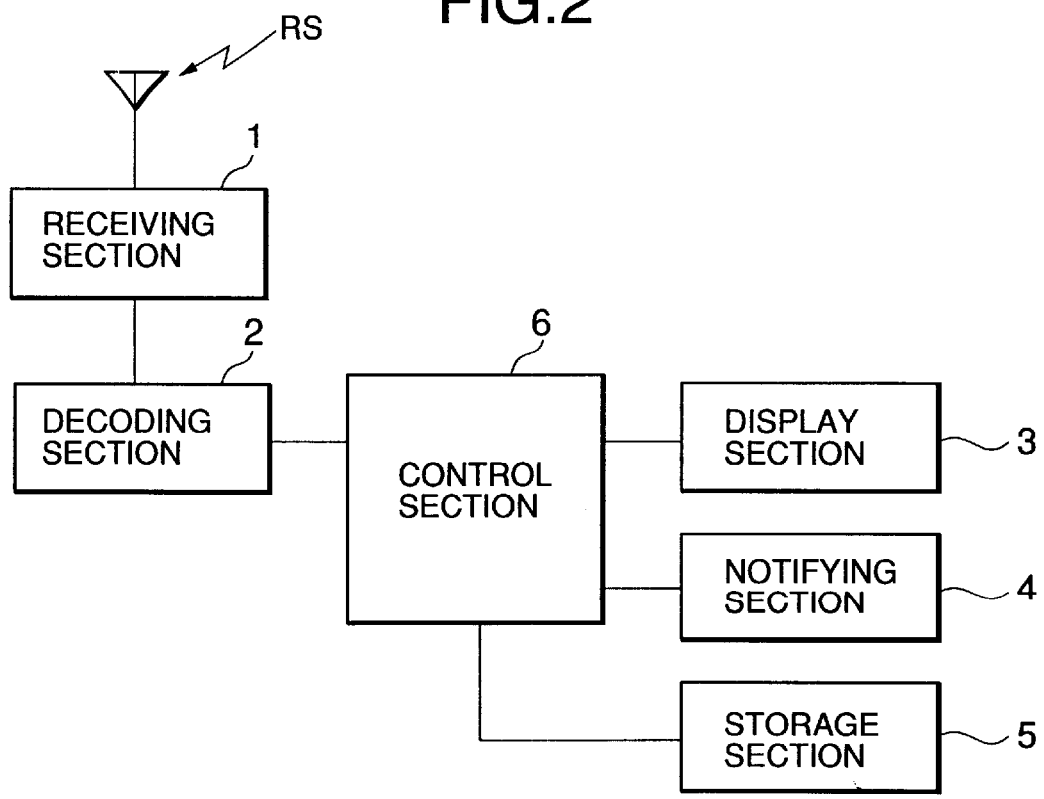
FIG. 2 is a block diagram showing a radio selective calling apparatus according to the first embodiment of the present invention.

FIG. 2 is a block diagram showing a radio selective calling apparatus according to the first embodiment of the present invention. As shown in FIG. 2, the radio selective calling apparatus according to the first embodiment of the present invention includes a receiving section 1, a decoding section 2, a notifying section 4, a storage section 5, a display section 3, and a control section 6. The receiving section 1 receives a coded radio signal RS from a base station. The decoding section 2 receives the radio signal RS from the receiving section 1 and decodes it. When a selective call signal for the self-apparatus is contained in the decoded radio signal RS, the decoding section 2 extracts message information including message data indicating a message from the radio signal RS, and outputs the information. The notifying section 4 notifies the user of the reception of the message by means of a buzzer, an LED, a vibrator, or the like. The storage section 5 stores the message data. The display section 3 displays the message data. The control section 6 receives the message information from the decoding section 2. When a processing designation code for designating the contents of processing for the message data is contained in this message information, the control section 6 performs the processing designated by this processing designation code. If no processing designation code is contained, the control section 6 causes the notifying section 4 to notify the reception of the message, and causes the storage section 5 to store the message data. In addition, the control section 6 causes the display section 3 to display the message data.

If the processing designation code is a code for designating "protection" indicating that the message data is excluded from erase targets, the protection designation data as data for designating protection is stored in the storage section 5 in correspondence with the message data. If the processing designation data is a code for designating "protection cancellation" indicating that the message data is an erase target, it is checked whether the message data in the message information in which the processing designating code was contained is stored in the storage section 5 in advance. If this message data is stored in advance, the protection designation data as data for designating protection, which is stored in correspondence with the message data, is erased. If the processing designation code is a code for designating "erasure" indicating the message data is to be erased, it is checked whether the message data in the message information in which the processing designation code was contained is stored in the storage section 5 in advance. If the message data is stored in advance, the message data is erased when the protection designation data as data for designating protection is not stored in the storage section 5 in correspondence with the message data.

The operation of the radio selective calling apparatus of this embodiment will be described in detail next with reference to FIGS. 3 to 5.

Figure 3:
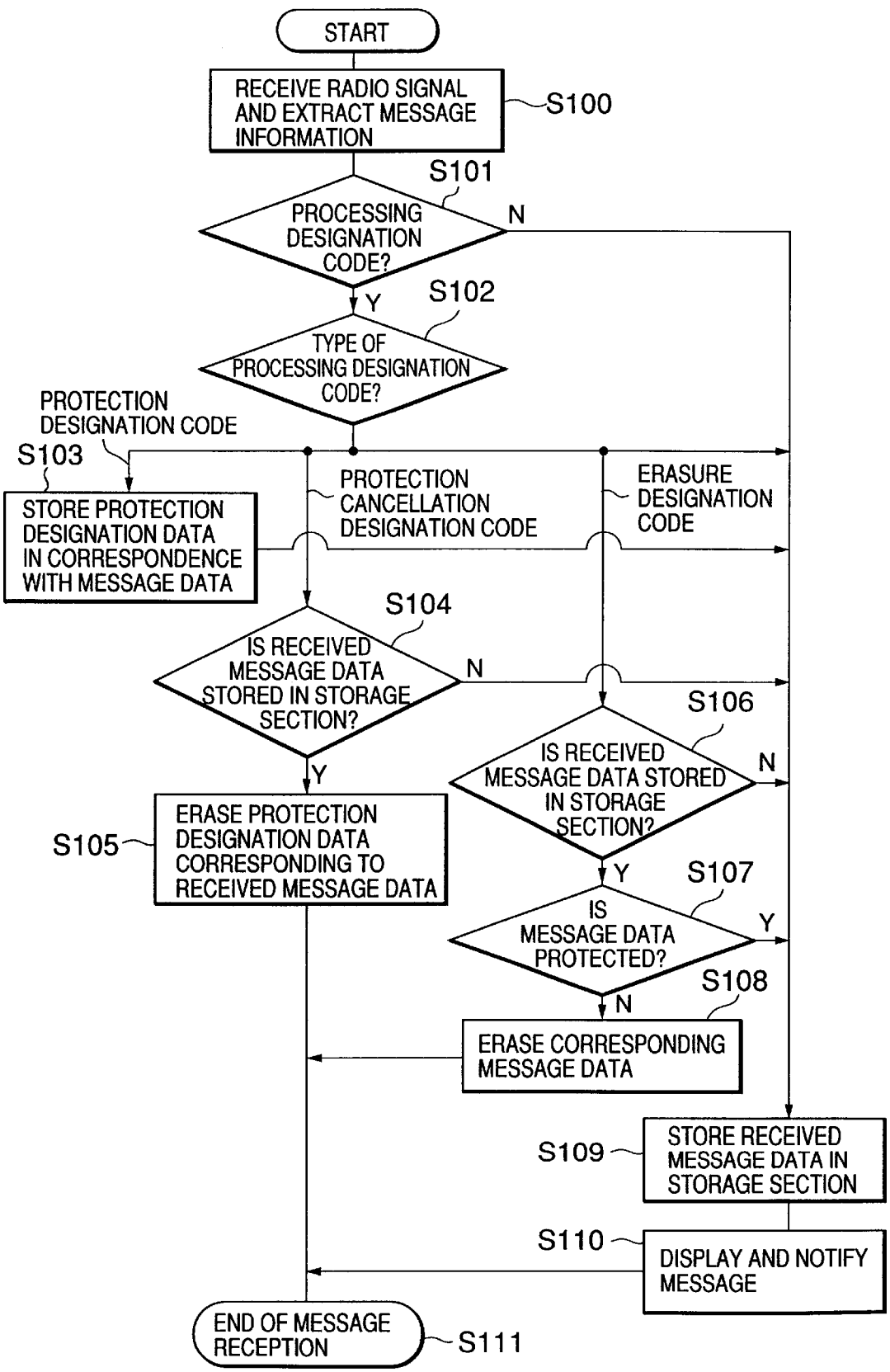
FIG. 3 is a flow chart showing the operation of the first embodiment in FIG. 2.

FIG. 3 is a flow chart showing an example of the operation of the first embodiment of the present invention.

Figure 4:
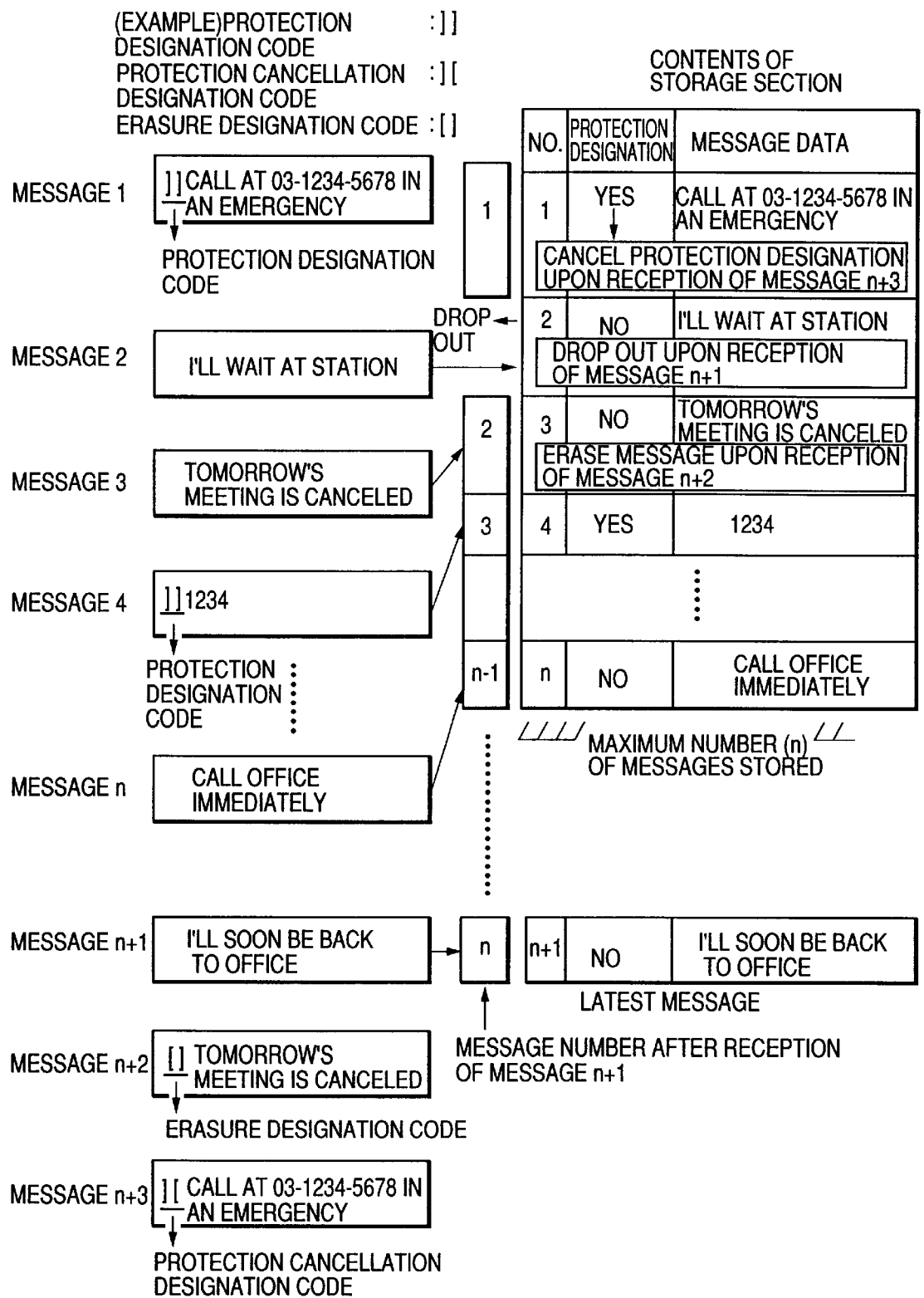
FIG. 4 is a view showing an example of how a storage section operates in the first embodiment in FIG. 2.

FIG. 4 is a view for explaining an example of how the storage section operates.

Figure 5:
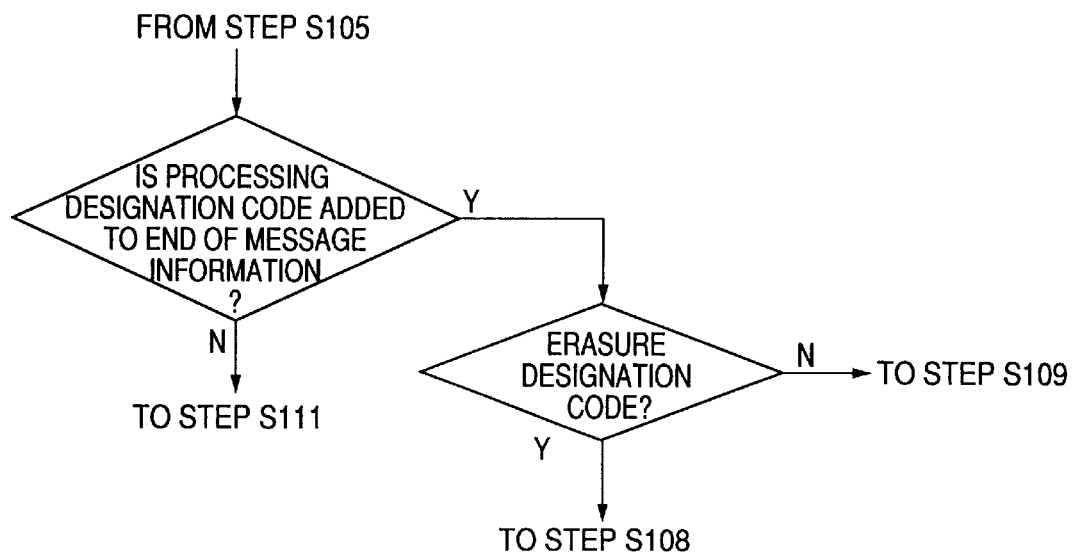
FIG. 5 is a flow chart to be added to the flow chart in FIG. 3 when a processing designation code is added to the end of message information.

FIG. 5 is a flow chart to be added to the flow chart in FIG. 3 when a processing designation code is added to the end of message information.

Referring to FIGS. 2 and 3, the receiving section 1 receives a coded radio signal RS from a base station, and the decoding section 2 receives the radio signal RS from the receiving section 1 and decodes it. If the selective call number of the self-apparatus is contained in the decoded radio signal RS, the decoding section 2 extracts message information including message data indicating a message from the radio signal RS and outputs the information (step S100).

The control section 6 receives the message information from the decoding section 2 and checks whether a processing designation code for designating the contents of processing for the message data is added to, for example, the beginning of the message information (step S101). If the check result indicates that no processing designation code is added, the control section 6 causes the storage section 5 to store the message data in the message information (step S109), causes the display section 3 to display the message data, and causes the notifying section 4 to notify the reception of the message (step S110). The control section 6 then terminates the message receiving operation (step S111). If it is determined in step S101 that the processing designation code is added, the control section 6 checks whether the processing designation code is any one of the codes for designating "protection", "protection cancellation", and "erasure" (step S102). If the check result indicates that the processing designation code is none of the codes for designating "protection", "protection cancellation", and "erasure", the flow advances to step S109 to continue control. If the check result in step S102 indicates the code for designating "protection", the protection designation data as data for designating protection is stored in the storage section 5 in correspondence with the message data in this message information (step S103). The flow then advances to step S109 to continue control. If the check result in step S102 indicates the code for designating "protection cancellation", the control section 6 checks whether the message data in the message information in which the processing designation code was contained is stored in the storage section 5 in advance (step S104). If the check result indicates that the message data is not stored in advance, the flow advances to step S109 to continue control. If it is determined in step S104 that the message data is stored in advance, the protection designation data as data for designating protection is erased, which is stored in the storage section 5 in correspondence with this stored message data (step S105). The message receiving operation is then terminated (step S111). If the check result in step S102 indicates the code for designating "erasure", the control section 6 checks whether the message data in the message information in which the processing designation data was contained is stored in the storage section 5 in advance (step S106). If the check result indicates that the message data is not stored in advance, the flow advances to step S109 to continue control. If the check result in step S106 indicates that the message data is stored, the control section 6 checks whether the protection designation data as data for designating protection is stored in correspondence with this stored message data (step S107). If the check result indicates that the data is stored, the flow advances to step S109 to continue control. If the check result in step S107 indicates that the data is not stored, the message data stored in the storage section 5 is erased (step S108), and the message receiving operation is terminated (step S111).

The operation of the storage section 5 will be described below with reference to FIG. 4. As shown in this case, for example, the processing designation code "]]" as the code for designating "protection", the processing designation code "][" as the code for designating "protection cancellation", and the processing designation code "[]" as the code for designating "erasure" are registered in a ROM or the like (not shown). The processing designation code in received message information is searched out by using these codes. Pieces of message information are sequentially received. Since the code "]]" is added to the beginning of message information 1, this code is determined as the code for designating "protection", and protection is set for the contents following the code (i.e., the protection designation data is made to correspond to the message data), and the resultant data is stored in the storage section 5. Subsequently, pieces of message information 2 and 3 are received as pieces of conventional message information having no processing designation code, and these message data are stored in the storage section 5. Since the code "]]" is added to the beginning of message information 4 like message information 1, protection is set for this information and the resultant information is stored in the storage section 5. When message information n+1 ("I'll soon be back to the office") is received after message data is stored in the storage section 5 to its maximum number n of message data to be stored, the oldest message data that has been received at the earliest time is dropped out (discarded). In this case, since message data No. 1 is protected, next oldest message data No. 2 is dropped out. When message information n+2 is received, since the code "[]" for designating "erasure" is added to the beginning of this message information, message data having the same contents as those following this code is searched out from the storage section 5, and the corresponding message data (message data No. 3 "Tomorrow's meeting will be canceled" in this case) is erased. When message information n+3 is received, since the code "][" for designating "protection cancellation" is added to the beginning of this message information, message data corresponding to the message data following this code is searched out from the storage section 5, and its protection is canceled (the protection designation data is erased). With the above operation, the message provider can erase message data erroneously transmitted to the user at the receiving end or can inform the user of message data with a high degree of importance at the receiving end by performing operation at the transmitting end.

In the above description, a processing designation code is added to the beginning of message information. However, the second processing designation code may be added to the end of the message information. More specifically, after step S105 in the flow chart in FIG. 3 that shows an example of the operation of the first embodiment, it is checked whether any processing designation code is added to the end of the message information (step S200), as shown in FIG. 5. If the check result indicates the absence of a processing designation code, the message receiving operation is terminated (step S111). If it is determined in step S200 that a processing designation code is present, it is checked whether this code is the code for designating "erasure" (step S201). If the check result indicates that this code is not the code for designating "erasure", the flow advances to step S109 to continue control. If it is determined in step S200 that this code is the code for designating "erasure", the flow advances to step S108 to continue control.

Figure 6:
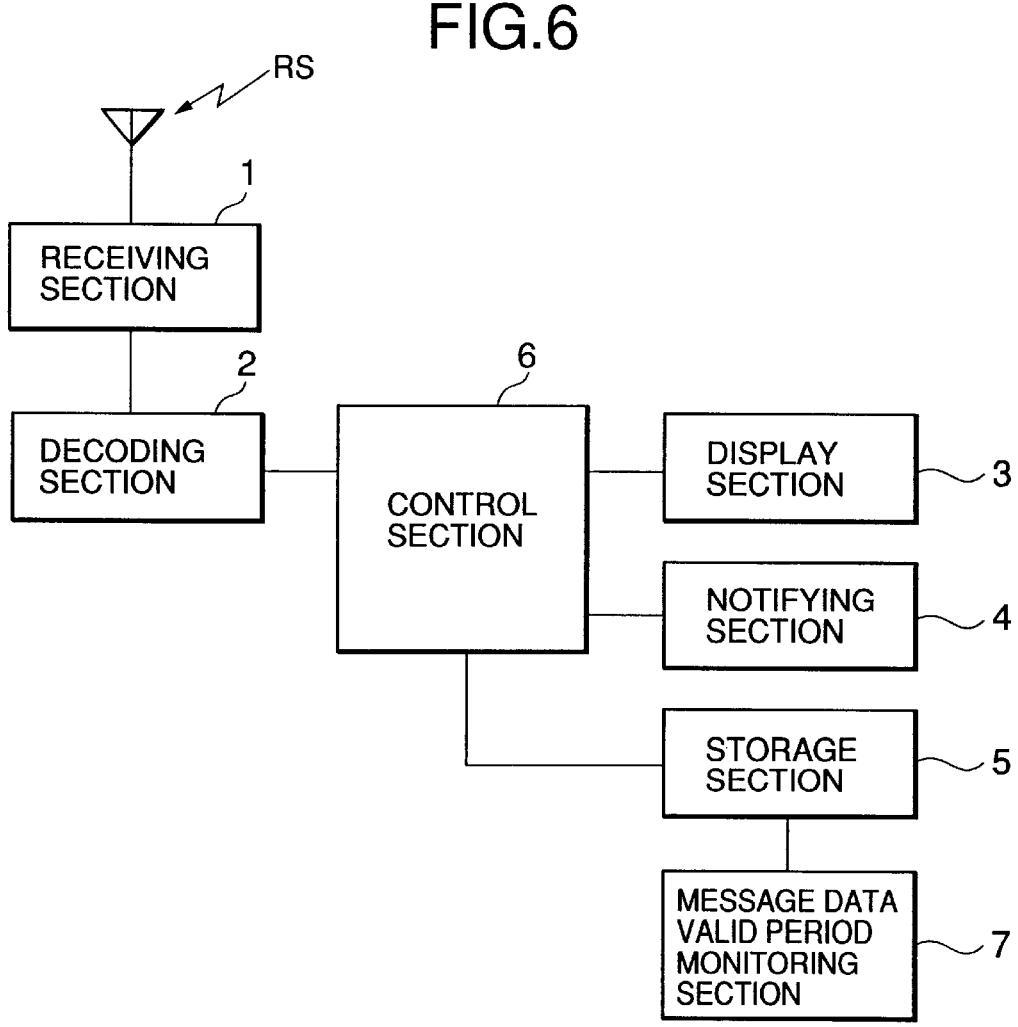
FIG. 6 is a block diagram showing a radio selective calling apparatus according to the second embodiment of the present invention.

FIG. 6 is a block diagram showing a radio selective calling apparatus according to the second embodiment of the present invention.

In addition to the arrangement of the radio selective calling apparatus according to the first embodiment of the present invention, this embodiment shown in FIG. 6 includes a message data valid period monitoring section 7 for checking the valid period data stored in a storage section 5, which indicates the valid period indicating the time interval during which the message data is not erased, at a predetermined timing, and erasing the message data stored in the storage section 5 in correspondence with the valid period data when this data indicates the expiration of the message data. If a given processing designation code is the code for designating "valid period" indicating the time interval during which the message data is not erased, the valid period data indicating the valid period is stored in the storage section 5 in correspondence with the message data. If data indicating the valid period is contained in message information in which a processing designation code was contained, this stored valid period data is set as the data indicating the valid period. If no date indicating the valid period is contained in the message information, the valid period data is set as predetermined data.

The operation of the radio selective calling apparatus according to the second embodiment of the present invention will be described in detail next with reference to FIG. 7.

Figure 7:
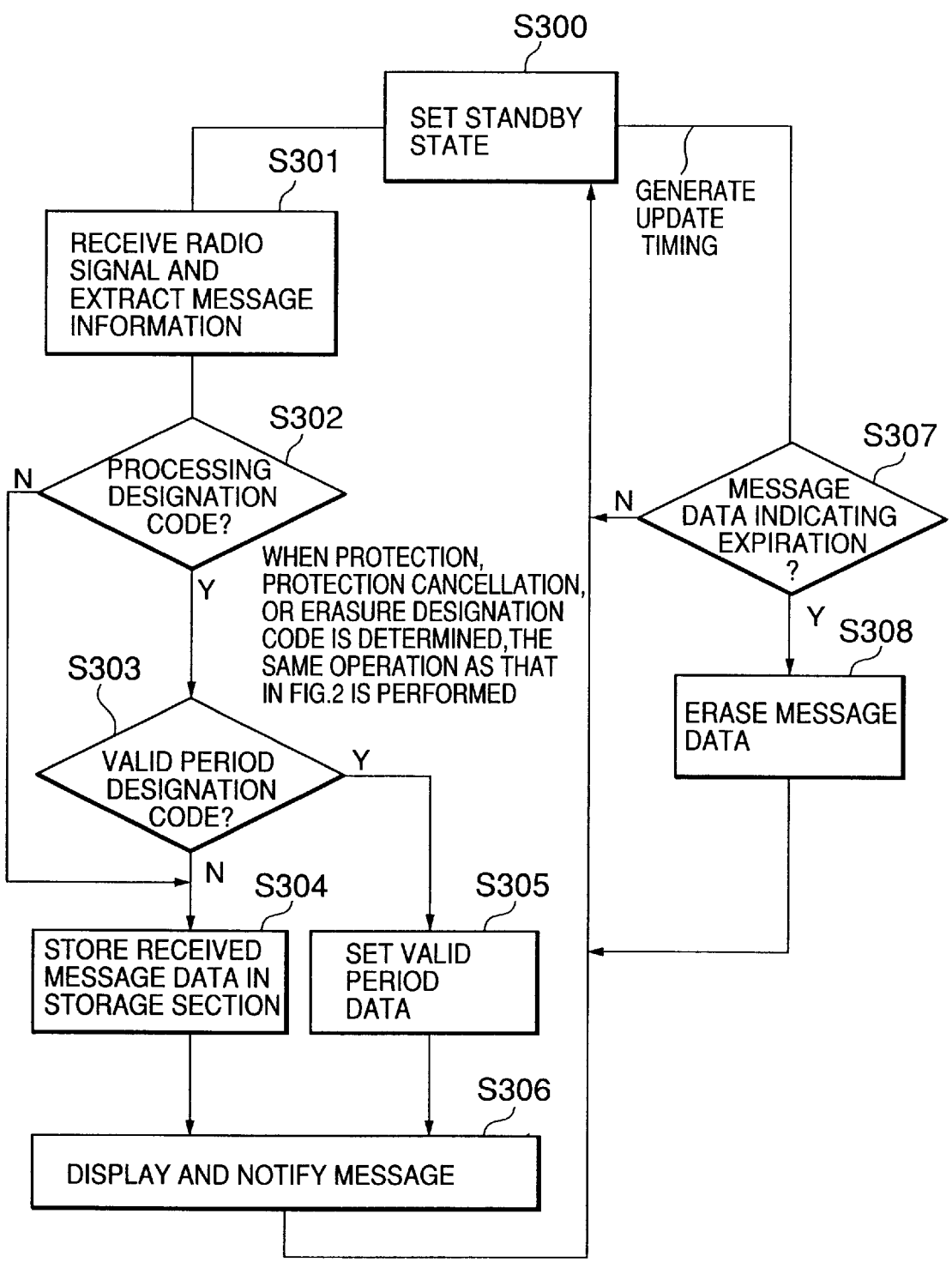
FIG. 7 is a flow chart showing the operation of the second embodiment in FIG. 6.

FIG. 7 is a flow chart showing an example of the operation of the second embodiment of the present invention.

Referring to FIGS. 6 and 7, when a receiving section 1 receives a coded radio signal RS from a base station in a standby state (step S300) in which the flow waits for the reception of message information or the like, a decoding section 2 receives the radio signal RS from the receiving section 1 and decodes it. If the selective call number of the self-apparatus is contained in the decoded radio signal RS, the decoding section 2 extracts message information including message data indicating a message from the radio signal RS and outputs the information (step S301).

A control section 6 receives the message information from the decoding section 2 and checks whether a processing designating code for designating the contents of processing for the message data is added to, for example, the beginning of the message information (step S302). If the check result indicates that no processing designation code is added, the control section 6 causes the storage section 5 to store the message data in the message information (step S304), causes a display section 3 to display the message data, and causes a notifying section 4 to notify the reception of the message (step S306). The flow then returns to the standby state (step S300). If it is determined in step S302 that a processing designation code is added, the control section 6 checks whether the processing designation code is any one of the codes for designating "protection", "protection cancellation", "erasure", and "valid period" (step S303). If the check result indicates that the processing designation code is none of the codes for designating "protection", "protection cancellation", "erasure", and "valid period", the flow advances to step S304 to continue control. If the check result in step S303 indicates that the processing designation code is the code for designating "protection", "protection cancellation", or "erasure", this apparatus operates in the same manner as the radio selective calling apparatus of the embodiment shown in FIG. 2. A description of this operation will therefore be omitted. If the check result in step S303 indicates that the processing designation code is the code for designating "valid period", the valid period data indicating the valid period is stored in the storage section 5 in correspondence with the message data. If data indicating the valid period is contained in the message information in which the processing designation code was contained, this stored valid period data is set as the data indicating the valid period. If no date indicating the valid period is contained in the message information, the valid period data is set as predetermined data (step S305). The flow then advances to step S306 to continue control.

While the control section 6 is in the standby state (step S300), when a time update timing comes, which comes, for example, every hour, the monitoring section 7 checks whether message data corresponding to expiration is stored in the storage section 5 (step S307). If the corresponding message data is present, this message data is erased (step S308), and the flow returns to the standby state (step S300).

What is claimed is:

1. A radio selective calling apparatus comprising:
   a control section for receiving message information, said message information containing message data indicating a message from a base station and selectively containing a processing designation code for designating contents of processing for the message data, said control section for performing processing designated by the processing designation code,
   wherein said processing designation code includes a code which indicates a predetermined level of erasure protection for said message information such that a message comprising the code designating "protection" indicates that the message data is excluded from being erased,
   wherein said message data is excluded from being erased until one of a plurality of predetermined processing designation codes is subsequently received,
   wherein a radio selective calling is performed by controlling each said message from said base station selectively containing said processing designation code, and
   wherein said message data is excluded from being erased until message information is received with message data identical to said excluded message data, said identical message data comprising the code designating "protection cancellation".

2. An apparatus according to claim 1, wherein protection designation data as data for designating protection is stored in correspondence with the message data.

3. An apparatus according to claim 1, wherein a check is performed to ascertain if the message data in the message information in which the processing designation code is contained is stored in advance, and
   wherein protection designation data as data for designating protection which is stored in correspondence with the message data is erased if the message data is stored in advance.

4. An apparatus according to claim 1, wherein the processing designation code comprises a code for designating "erasure" indicating that the message data is to be erased,
   wherein a check is performed to ascertain if the message data in the message information in which the processing designation code is contained is stored in advance, and
   wherein the message data is erased if protection designation data as data for designating protection is not stored in correspondence with the message data.

5. An apparatus according to claim 1, wherein the processing designation code comprises a plurality of processing designation codes.

6. An apparatus according to claim 1, wherein said processing designation code comprises a first processing designation code added to the beginning of said message information and a second processing designation code selectively added to the end of said message information.

7. An apparatus according to claim 1, wherein the processing designation code comprises a code for designating "valid period" indicating a time interval during which the message data is not erased, and
   wherein valid period data indicating a valid period is stored in correspondence with the message data.

8. An apparatus according to claim 7, wherein data indicating a valid period is contained in the message information containing the processing designation code, and
   wherein the valid period data stored in correspondence with the message data is set as data indicating the valid period, and when data indicating the valid period is not contained in the message information, predetermined data is set as data indicating the valid period.

9. An apparatus according to claim 7, wherein the stored valid period data is checked at a predetermined timing, and when the valid period indicated by the data has passed, the message data stored in correspondence with the valid period data is erased.

10. An apparatus according to claim 7, further comprising:
a message data valid period monitoring section for checking the stored valid period data at a predetermined timing, and erasing the message data stored in correspondence with the valid period data when the valid period indicated by the data has passed.

11. A radio selective calling apparatus comprising:
a control section for receiving message information, said message information containing message data indicating a message from a base station and selectively containing a processing designation code for designating contents of processing for the message data, said control section performing processing designated by the processing designation code, and when the processing designation code is not contained, notifying reception of the message, storing the message data, and displaying the message data,
wherein said processing designation code includes a code which indicates a predetermined level of erasure protection for said message information such that a message comprising the code designating "protection" indicates that the message data is excluded from being erased,
wherein said message data is excluded from being erased until one of a plurality of predetermined processing designation codes is subsequently received,
wherein a radio selective calling is performed by controlling each said message from said base station selectively containing said processing designation code, and
wherein said message data is excluded from being erased until message information is received with message data identical to said excluded message data, said identical message data comprising the code designating "protection cancellation".

12. An apparatus according to claim 11, wherein protection designation data as data for designating protection is stored in correspondence with the message data.

13. An apparatus according to claim 11, wherein a check is performed to ascertain if the message data in the message information in which the processing designation code is contained is stored in advance, and
wherein protection designation data as data for designating protection which is stored in correspondence with the message data is erased if the message data is stored in advance.

14. An apparatus according to claim 11, wherein the processing designation code comprises a code for designating "erasure" indicating that the message data is to be erased,
wherein a check is performed to ascertain if the message data in the message information in which the processing designation code is contained is stored in advance, and
wherein the message data is erased if protection designation data as data for designating protection is not stored in correspondence with the message data.

15. An apparatus according to claim 11, wherein the processing designation code comprises a plurality of processing designation codes.

16. An apparatus according to claim 11, wherein said processing designation code comprises a first processing designation code added to the beginning of said message information and a second processing designation code selectively added to the end of said message information.

17. An apparatus according to claim 11, wherein the processing designation code comprises a code for designating "valid period" indicating a time interval during which the message data is not erased, and
wherein valid period data indicating a valid period is stored in correspondence with the message data.

18. An apparatus according to claim 17, wherein data indicating a valid period is contained in the message information containing the processing designation code, and
wherein the valid period data stored in correspondence with the message data is set as data indicating the valid period, and when data indicating the valid period is not contained in the message information, predetermined data is set as data indicating the valid period.

19. An apparatus according to claim 17, wherein the stored valid period data is checked at a predetermined timing, and when the valid period indicated by the data has passed, the message data stored in correspondence with the valid period data is erased.

20. An apparatus according to claim 17, further comprising:
a message data valid period monitoring section for checking the stored valid period data at a predetermined timing, and erasing the message data stored in correspondence with the valid period data when the valid period indicated by the data has passed.

21. A radio selective calling apparatus comprising:
a decoding section for decoding a coded radio signal sent from a base station, and when a selective call number of said apparatus is contained in the decoded radio signal, extracting message information containing message data indicating a message from the radio signal, and outputting the information; and
a control section for receiving the message information from said decoding section, said message information selectively containing a processing designation code for designating contents of processing for the message data, said control section performing processing designated by the processing designation code, and when the processing designation code is not selectively contained, causing a notifying section to notify reception of the message, causing a storage section to store the message data, and causing a display section to display the message data,
wherein said processing designation code includes a code which indicates a predetermined level of erasure protection for said message information such that a message comprising the code designating "protection" indicates that the message data is excluded from being erased,
wherein said message data is excluded from being erased until one of a plurality of predetermined processing designation codes is subsequently received,
wherein a radio selective calling is performed by controlling each said message from said base station selectively containing said processing designation code, and
wherein said message data is excluded from being erased until message information is received with message data identical to said excluded message data, said identical message data comprising the code designating "protection cancellation".

22. An apparatus according to claim 21, wherein protection designation data as data for designating protection is stored in correspondence with the message data.

23. An apparatus according to claim 21, wherein a check is performed to ascertain if the message data in the message information in which the processing designation code is contained is stored in advance, and wherein protection designation data as data for designating protection which is stored in correspondence with the message data is erased if the message data is stored in advance.

24. An apparatus according to claim 21, wherein the processing designation code comprises a code for designating "erasure" indicating that the message data is to be erased, wherein a check is performed to ascertain if the message data in the message information in which the processing designation code is contained is stored in advance, and wherein the message data is erased if protection designation data as data for designating protection is not stored in correspondence with the message data.

25. An apparatus according to claim 21, wherein the processing designation code comprises a plurality of processing designation codes.

26. An apparatus according to claim 21, wherein said processing designation code comprises a first processing designation code added to the beginning of said message information and a second processing designation code selectively added to the end of said message information.

27. An apparatus according to claim 21, wherein the processing designation code comprises a code for designating "valid period" indicating a time interval during which the message data is not erased, and wherein valid period data indicating a valid period is stored in correspondence with the message data.

28. An apparatus according to claim 27, wherein data indicating a valid period is contained in the message information containing the processing designation code, and wherein the valid period data stored in correspondence with the message data is set as data indicating the valid period, and when data indicating the valid period is not contained in the message information, predetermined data is set as data indicating the valid period.

29. An apparatus according to claim 27, wherein the stored valid period data is checked at a predetermined timing, and when the valid period indicated by the data has passed, the message data stored in correspondence with the valid period data is erased.

30. An apparatus according to claim 27, further comprising:

a message data valid period monitoring section for checking the stored valid period data at a predetermined timing, and erasing the message data stored in correspondence with the valid period data when the valid period indicated by the data has passed.

31. A radio selective calling apparatus comprising:

a receiving section for receiving a coded radio signal from a base station;

a decoding section for receiving the radio signal from said receiving section and decoding the radio signal, and when a selective call number of said apparatus is contained in the decoded radio signal, extracting message information containing message data indicating a message from the radio signal, and outputting the information;

a notifying section for notifying reception of the message;

a storage section for storing the message data;

a display section for displaying the message data; and a control section for receiving the message information from said decoding section, said message information selectively containing a processing designation code for designating contents of processing for the message data, said control section performing processing designated by the processing designation code, and when the processing designation code is not selectively contained, causing said notifying section to notify reception of the message, causing said storage section to store the message data, and causing said display section to display the message data, wherein said processing designation code includes a code which indicates a predetermined level of erasure protection for said message information such that a message comprising the code designating "protection" indicates that the message data is excluded from being erased, wherein said message data is excluded from being erased until one of a plurality of predetermined processing designation codes is subsequently received, wherein a radio selective calling is performed by controlling each said message information from said base station selectively containing said processing designation code, and wherein said message data is excluded from being erased until message information is received with message data identical to said excluded message data, said identical message data comprising the code designating "protection cancellation".

32. An apparatus according to claim 31, wherein protection designation data as data for designating protection is stored in correspondence with the message data.

33. An apparatus according to claim 31, wherein a check is performed to ascertain if the message data in the message information in which the processing designation code is contained is stored in advance, and wherein protection designation data as data for designating protection which is stored in correspondence with the message data is erased if the message data is stored in advance.

34. An apparatus according to claim 31, wherein the processing designation code comprises a code for designating "erasure" indicating that the message data is to be erased, wherein a check is performed to ascertain if the message data in the message information in which the processing designation code is contained is stored in advance, and wherein the message data is erased if protection designation data as data for designating protection is not stored in correspondence with the message data.

35. An apparatus according to claim 31, wherein the processing designation code comprises a plurality of processing designation codes.

36. An apparatus according to claim 31, wherein said processing designation code comprises a first processing designation code added to the beginning of said message information and a second processing designation code selectively added to the end of said message information.

37. An apparatus according to claim 31, wherein the processing designation code comprises a code for designating "valid period" indicating a time interval during which the message data is not erased, and wherein valid period data indicating a valid period is stored in correspondence with the message data.

38. An apparatus according to claim 37, wherein data indicating a valid period is contained in the message information containing the processing designation code, and wherein the valid period data stored in correspondence with the message data is set as data indicating the valid period, and when data indicating the valid period is not contained in the message information, predetermined data is set as data indicating the valid period.

39. An apparatus according to claim 37, wherein the stored valid period data is checked at a predetermined timing, and when the valid period indicated by the data has passed, the message data stored in correspondence with the valid period data is erased.

40. An apparatus according to claim 37, further comprising:

message data valid period monitoring section for checking the stored valid period data at a predetermined timing, and erasing the message data stored in correspondence with the valid period data when the valid period indicated by the data has passed.

* * * * *